United States Patent
Suganuma et al.

(10) Patent No.: US 6,463,373 B2
(45) Date of Patent: Oct. 8, 2002

(54) FAIL-SAFE SYSTEM IN INTEGRATED CONTROL OF VEHICLE

(75) Inventors: Takeshi Suganuma, Kariya; Yoshimitsu Fujii, Okazaki, both of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/046,990

(22) Filed: Jan. 17, 2002

(65) Prior Publication Data

US 2002/0099487 A1 Jul. 25, 2002

(30) Foreign Application Priority Data

Jan. 25, 2001 (JP) ........................................ 2001-017182

(51) Int. Cl.[7] ........................... B60R 16/02; G06F 11/00
(52) U.S. Cl. ........................ 701/48; 701/33; 701/34; 701/36-38; 701/29; 701/43; 701/45; 701/49; 303/112; 717/168; 91/167
(58) Field of Search ....................... 701/48, 49, 45, 701/43, 36–38, 34, 29, 33; 104/85, 154, 53; 303/112; 717/168; 91/167 R; 700/288

(56) References Cited

U.S. PATENT DOCUMENTS

| | | | |
|---|---|---|---|
| 4,532,594 A | | 7/1985 | Hosaka et al. ............ 701/114 |
| 4,580,222 A | * | 4/1986 | Fujii ..................... 701/114 |
| 4,802,100 A | * | 1/1989 | Aasen et al. ............. 290/4 R |
| 5,046,397 A | * | 9/1991 | Ezell et al. ................ 60/443 |
| 5,957,985 A | | 9/1999 | Wong et al. ............... 701/33 |
| 6,168,321 B1 | * | 1/2001 | Tanaka et al. .......... 365/230.03 |
| 2001/0038241 A1 | * | 11/2001 | Grote et al. .............. 303/112 |
| 2001/0041956 A1 | * | 11/2001 | Wong et al. ............... 701/36 |

FOREIGN PATENT DOCUMENTS

| | | |
|---|---|---|
| JP | 53-114630 | 10/1978 |
| JP | 64-13601 | 1/1989 |
| JP | 4-279836 | 10/1992 |
| JP | 2000-148709 | 5/2000 |

* cited by examiner

Primary Examiner—William A. Cuchlinski, Jr.
Assistant Examiner—Ronnie Mancho
(74) Attorney, Agent, or Firm—Nixon & Vanderhye P.C.

(57) ABSTRACT

A fail-safe system used in integrated control of a vehicle includes structural-element control portions. Preset priority degrees are given to the structural-element control portions, respectively. A manager control portion stores one or more substitute programs designed to implement functions of ones among the structural-element control portions which are necessary for travel of the vehicle. A downloading device operates for, when one of the structural-element control portions which is necessary for travel of the vehicle fails, selecting one from non-failed ones of the structural-element control portions as a download destination in accordance with the priority degrees and downloading the substitute program corresponding to the failed structural-element control portion into the selected download-destination structural-element control portion. The selected download-destination structural-element control portion is lower in priority degree than the failed structural-element control portion. The download-destination structural-element control portion serves for the failed structural-element control portion according to the downloaded substitute program.

17 Claims, 6 Drawing Sheets

FIG. 3

| | PROCESSING SPEED [MIPS] | MICROCOMPUTER MEMORY SIZE [KB] | PRIORITY | |
|---|---|---|---|---|
| ① ENGINE ECU | 25 | 320 | A | HIGH |
| ② TRANSMISSION ECU | 25 | 320 | A | |
| ③ TRAVEL CONTROL ECU | 15 | 128 | A | |
| ④ FIRST BODY ECU | 3 | 64 | B | PRIORITY |
| ⑤ NAVIGATION ECU | 25 | 4000 | C | |
| ⑥ AIR-CONDITIONER ECU | 5 | 128 | D | |
| ⑦ SECOND BODY ECU | 1 | 16 | E | LOW |

FIG. 4

| | NECESSARY PROCESS SPEED [MIPS] | PROGRAM SIZE [KB] | PRIORITY |
|---|---|---|---|
| ⑪ ENGINE ECU BASIC FUNCTION | 7 | 32 | A |
| ⑫ TRANSMISSION ECU BASIC FUNCTION | 5 | 16 | A |
| ⑬ TRAVEL CONTROL ECU BASIC FUNCTION | 3 | 16 | A |

FAIL-SAFE SYSTEM IN INTEGRATED CONTROL OF VEHICLE

BACKGROUND OF THE INVENTION

1. Field of the Invention

This invention relates to a fail-safe system used in integrated control of a vehicle such as an automotive vehicle. In addition, this invention relates to a method of fail-safe.

2. Description of the Related Art

An integrated control system for a vehicle includes a plurality of computer-based controllers designed to control structural elements (structural components) of the vehicle. Data can be transmitted among the controllers. The data transmission among the controllers enables the integrated control system to provide stable control of the vehicle.

The structural elements of the vehicle include, for example, an engine, a transmission, and an air conditioner. The controllers are assigned to actuators in the structural elements. In the event that one of the controllers fails, the assigned actuator or actuators can not be driven and controlled. In this case, there is a possibility that the vehicle can not travel at all and limp homing can not be carried out.

Japanese patent application publication number P2000-14709A discloses a multi-CPU system in which the failure of one CPU can be detected by another CPU operating normally. The normal CPU gets system information about the failed CPU. The normal CPU extracts, from the system information, a program assigned to the failed CPU. The normal CPU loads the extracted program into a memory therein or a memory in a reserve CPU. Thus, the normal CPU or the reserve CPU operates in accordance with the loaded program, and serves for the failed CPU.

Japanese patent application publication number 53-114630 discloses a first data highway system including a master station and a sub-master station. The master station has a CPU. Similarly, the sub-master station has a CPU. The CPU of the master station and the CPU of the sub-master station are connected via a data link module. In the event that the CPU of the master station fails, the CPU of the sub-master station is notified of the CPU failure via the data link module. The CPU of the sub-master station outputs a capture instruction to the CPU of the master station, and the sub-master station serves as a master station. The CPU of the sub-master station is loaded with data from an external storage device to perform backup of the data highway system in an on-line manner. Japanese application 53-114630 also discloses a second data highway system including a master station and a sub-master station which are physically independent of each other. An external storage device of the sub-master station has a special area storing the same data as those in an external storage device of the master station. In the event that the master station fails, a CPU of the sub-master station accesses the special area of the external storage device thereof so that the sub-master station serves as a master station.

U.S. Pat. No. 4,532,594 relates to an electronic control system for an automotive vehicle which includes an engine control system and a vehicle driving information system. The engine control system operates for controlling the engine operation by using a microcomputer. The vehicle driving information system operates for preparing and displaying various pieces of driving information by using another microcomputer. The two microcomputers are partners. A backup program is stored in each microcomputer for, when the partner microcomputer fails, backing up at least the critical jobs of the partner microcomputer to ensure the continuance of safe operation of the vehicle.

Japanese patent application publication number 64-13601 discloses an electronic control apparatus for a vehicle which includes a main memory and a second memory. The second memory is of a battery-backed-up type. When an engine stops, information is transferred from a prescribed area of the main memory and is saved to the second memory. After the save of the information is confirmed, a power supply is turned off. When the power supply is turned on, the information is transferred from the second memory back to the prescribed area of the main memory.

U.S. Pat. No. 5,957,985 relates to a failure-resilient automobile control system which integrates diverse and separate automobile components and provides fault-tolerance to component failure. The automobile control system includes a master control unit (MCU) electrically coupled via a primary data communications bus to the electronic automobile components. The MCU is master of the bus and manages data flow over the bus among the electronic automobile components. The MCU can be configurated with a routing table to route data monitored in one component to one or more other components. The MCU is also capable of performing the same functions as those performed by local controllers at the electronic components. During initialization, driver software for all of the local controllers is downloaded and stored at the MCU. In the event that a local controller fails, the MCU executes the driver software for the failed controller to remotely control the electronic automobile component in place of the failed local controller. Switching logic is installed at each of the electronic components to selectively route data to the primary bus, circumventing the failed controller. The automobile control system has a secondary control unit (SCU) electrically coupled to the MCU via the primary bus. The SCU is a stand-alone computer that supports clients and other devices on a secondary support bus. The SCU is also configurated to backup the MCU. During normal operation, the SCU is subordinate to and controlled by the MCU on the primary bus. In the event that the MCU fails, the SCU assumes control of the data communications network and manages the data flow among the electronic automobile components.

Japanese patent application publication number 4-279836 discloses a master-slave multi-processor system for a control and diagnostic apparatus in a motor vehicle. For separate and optionally simultaneous overlapping execution of various programs, the multi-processor system uses only one ROM which can be easily replaced or one RAM having contents that can be newly loaded or overwritten via an interface. The multi-processor system allows the optional use of at least one slave processor for arbitrarily different or alterable tasks. Data in a storage area of the slave processor can be modified or subjected to overwriting in accordance with the contents of the ROM or the RAM by fast access from a master processor.

SUMMARY OF THE INVENTION

It is a first object of this invention to provide an improved fail-safe system in integrated control of a vehicle.

It is a second object of this invention to provide an improved method of fail-safe.

A first aspect of this invention provides a fail-safe system used in integrated control of a vehicle. The fail-safe system comprises a plurality of actuators for actuating a plurality of structural elements provided on the vehicle, respectively; a plurality of sensors for detecting state quantities used in control of operation of the structural elements, respectively; a plurality of structural-element control portions for driving and controlling the actuators on the basis of the state quantities detected by the sensors according to preset control programs, respectively, wherein preset priority degrees are given to the structural-element control portions respectively; a manager control portion for storing one or more substitute programs designed to implement functions of ones among the structural-element control portions which are necessary for travel of the vehicle; a communication line; wherein actuators and sensors among the actuators and the sensors which are necessary for travel of the vehicle, the structural-element control portions, and the manager control portion are connected to the communication line to implement communications thereamong; failure detecting means for detecting failures of the structural-element control portions; and downloading means for, when the failure detecting means detects a failure of one of the structural-element control portions which is necessary for travel of the vehicle, selecting one from non-failed ones of the structural-element control portions as a download destination in accordance with the priority degrees and downloading the substitute program corresponding to the failed structural-element control portion into the selected download-destination structural-element control portion, the selected download-destination structural-element control portion being lower in priority degree than the failed structural-element control portion; wherein the download-destination structural-element control portion drives and controls the actuator corresponding to the failed structural-element control portion on the basis of the state quantity detected by the sensor corresponding to the failed structural-element control portion according to the downloaded substitute program.

A second aspect of this invention provides a method of fail-safe used in integrated control of a vehicle. The method comprises the steps of detecting state quantities used in control of operation of vehicle structural elements actuated by actuators; enabling structural-element control portions to drive and control the actuators on the basis of the detected state quantities according to preset control programs, respectively, wherein preset priority degrees are given to the structural-element control portions respectively; detecting whether or not each of ones among the structural-element control portions which are necessary for travel of the vehicle fails; and when it is detected that one among the structural-element control portions which is necessary for travel of the vehicle fails, selecting one from non-failed ones of the structural-element control portions as a download destination in accordance with the priority degrees and downloading a substitute program corresponding to the failed structural-element control portion into the selected download-destination structural-element control portion, the selected download-destination structural-element control portion being lower in priority degree than the failed structural-element control portion; wherein the download-destination structural-element control portion drives and controls the actuator corresponding to the failed structural-element control portion on the basis of the detected state quantity corresponding to the failed structural-element control portion according to the downloaded substitute program.

A third aspect of this invention provides a fail-safe system used in integrated control of a vehicle. The fail-safe system comprises a plurality of input output elements; a plurality of structural-element control portions for operation with the input output elements according to preset control programs, respectively, wherein preset priority degrees are given to the structural-element control portions respectively; a manager control portion for storing one or more substitute programs designed to implement functions of ones among the structural-element control portions which are necessary for travel of the vehicle; a communication line; wherein ones among the input output elements which are necessary for travel of the vehicle, the structural-element control portions, and the manager control portion are connected to the communication line to implement communications thereamong; failure detecting means for detecting failures of the structural-element control portions; and downloading means for, when the failure detecting means detects a failure of one of the structural-element control portions which is necessary for travel of the vehicle, selecting one from non-failed ones of the structural-element control portions as a download destination in accordance with the priority degrees and downloading the substitute program corresponding to the failed structural-element control portion into the selected download-destination structural-element control portion, the selected download-destination structural-element control portion being lower in priority degree than the failed structural-element control portion; wherein the download-destination structural-element control portion serves for the failed structural-element control portion according to the downloaded substitute program.

BRIEF DESCRIPTION OF THE DRAWINGS

FIG. 3 is a diagram of the processing speeds, the storage capacities, and the priority degrees of electronic control units (ECUs) in FIG. 2.

FIG. 4 is a diagram of the minimum processing speeds necessary for the execution of basic programs corresponding to the basic functions of ECUs, the sizes of the basic programs, and the priority degrees of the ECUs.

DETAILED DESCRIPTION OF THE INVENTION

A prior-art system will be explained below for a better understanding of this invention.

Figure 1:
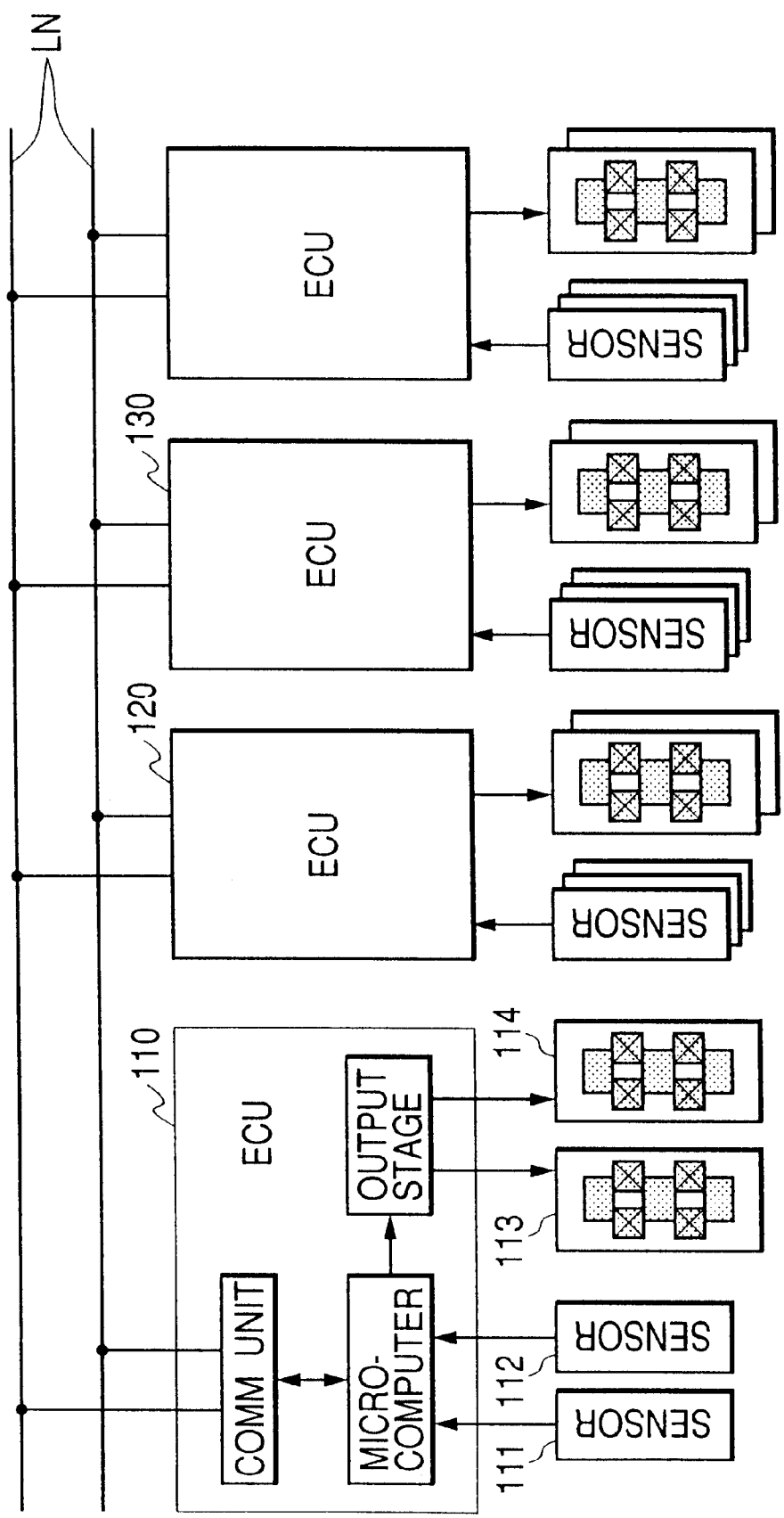
FIG. 1 is a block diagram of a prior-art integrated vehicle control system.

FIG. 1 shows a prior-art integrated vehicle control system including electronic control units (ECUs) 110, 120, and 130. The ECUs 110, 120, and 130 are connected to each other via communication lines LN. The ECUs 110, 120, and 130 can communicate with each other via the communication lines LN. Sensors 111 and 112, and actuators 113 and 114 are connected to the ECU 110. Similarly, other sensors and actuators are connected to the ECUs 120 and 130.

The ECU 110 drives and controls the actuators 113 and 114 in response to signals fed from the sensors 111 and 112 and also signals fed from the other ECUs via the communication lines LN. Similarly, each of the ECUs 120 and 130 operates on the actuators connected thereto. Accordingly, all the actuators are controlled on an integrated basis.

Each of the ECUs 110, 120, and 130 is assigned to only the actuators connected thereto. Therefore, in the event that the ECU 110 fails, the actuators 113 and 114 can not be driven and controlled. In this case, there is a possibility that the related vehicle can not travel at all and limp homing can not be carried out.

Basic Embodiments

A first basic embodiment of this invention relates to a fail-safe system used in an integrated control system for a vehicle. There are a plurality of structural elements (structural components) provided on the vehicle. Examples of the structural elements are an engine, an automatic transmission, a braking device, and an air conditioner. The integrated control system implements integrated control of the structural elements, thereby providing stable control of the vehicle.

The integrated control system for the vehicle includes a plurality of actuators for actuating the structural elements respectively, a plurality of sensors for detecting state quantities used in control of operation of the structural elements respectively, a plurality of structural-element control portions for driving and controlling the actuators on the basis of the state quantities detected by the sensors according to preset control programs respectively, and a manager control portion for monitoring operating conditions of the structural-element control portions. Ones among the actuators and the sensors which are necessary for travel of the vehicle, the structural-element control portions, and the manager control portion are connected to a communication line to implement communications thereamong. Thereby, the vehicle is controlled on an integrated basis.

Preferably, ones among the actuators and the sensors which are not necessary for travel of the vehicle are directly connected to the corresponding structural-element control portions without being connected to the communication line. This design is advantageous in cost since it is unnecessary to provide those actuators and sensors with functions of communications via the communication line. Alternatively, ones among the actuators and the sensors which are not necessary for travel of the vehicle may be directly connected to the communication line.

In the fail-safe system related to the first basic embodiment of this invention, preset priority degrees are given to the structural-element control portions respectively. The manager control portion stores one or more substitute programs designed to implement functions of ones among the structural-element control portions which are necessary for travel of the vehicle. In the event that one among the structural-element control portions which is necessary for travel of the vehicle fails, the structural element being an object to be controlled by the failed structural-element control portion can be controlled and operated according to the substitute program corresponding to the failed structural-element control portion.

Specifically, in the event that the manager control portion detects a failure of one among the structural-element control portions which is necessary for travel of the vehicle, a downloading means selects one from non-failed ones of the structural-element control portions as a download destination in accordance with the priority degrees and downloads the substitute program corresponding to the failed structural-element control portion into the selected download-destination structural-element control portion. The selected download-destination structural-element control portion is lower in priority degree than the failed structural-element control portion.

The download-destination structural-element control portion drives and controls the actuator corresponding to the failed structural-element control portion on the basis of the state quantity detected by the sensor corresponding to the failed structural-element control portion according to the downloaded substitute program.

Thus, in the event that one among the structural-element control portions which is necessary for travel of the vehicle fails, another structural-element control portion serves for the function of the failed structural-element control portion. Accordingly, the vehicle is enabled to continue to travel. Therefore, the vehicle can be moved to a safe place or a service station.

Preferably, the manager control portion stores one or more substitute programs designed to implement functions of only ones among the structural-element control portions which are necessary for travel of the vehicle. This design is advantageous in program management and cost. The manager control portion may store substitute programs designed to implement the functions of all the structural-element control portions.

The download-destination structural-element control portion may drive and control the actuator corresponding to the failed structural-element control portion on the basis of the state quantity detected by the sensor not corresponding to the failed structural-element control portion according to the downloaded substitute program. The download-destination structural-element control portion may drive and control the actuator not corresponding to the failed structural-element control portion on the basis of the state quantity detected by the sensor corresponding to the failed structural-element control portion according to the downloaded substitute program.

A second basic embodiment of this invention is based on the first basic embodiment thereof. The second basic embodiment of this invention features that the substitute programs include basic programs designed to implement basic functions of ones among the structural-element control portions which are necessary for travel of the vehicle. In the event that the manager control portion detects a failure of one among the structural-element control portions which is necessary for travel of the vehicle, the downloading means downloads the basic program corresponding to the failed structural-element control portion into the selected download-destination structural-element control portion.

The basic functions of the structural-element control portions mean simplified functions thereof which are necessary for travel of the vehicle. Program segments for implementing corrections and other fine procedures in the general vehicle control are omitted from the basic programs. Thus, the sizes of the basic programs are relatively small. Accordingly, each of the basic programs can be installed into ones of the structural-element control portions which have only small storage capacities. Therefore, more of the structural-element control portions can be selected as a download destination.

A third basic embodiment of this invention is based on the first basic embodiment thereof. The third basic embodiment of this invention features that ones among the structural-element control portions which are necessary for travel of the vehicle include an electronic control unit for controlling the engine as a structural element.

A fourth basic embodiment of this invention is based on the second basic embodiment thereof. The fourth basic embodiment of this invention features that ones among the structural-element control portions which are necessary for travel of the vehicle include an electronic control unit for controlling the engine as a structural element, and a basic function of the electronic control unit fixes a fuel injection rate and a spark timing. According to the basic function of the electronic control unit, it is possible to generate such an axle torque as to enable the vehicle to move.

A fifth basic embodiment of this invention is based on the first basic embodiment thereof. The fifth basic embodiment of this invention features that ones among the structural-element control portions which are necessary for travel of the vehicle include an electronic control unit for controlling the automatic transmission as a structural element.

A sixth basic embodiment of this invention is based on the second basic embodiment thereof. The sixth basic embodiment of this invention features that ones among the structural-element control portions which are necessary for travel of the vehicle include an electronic control unit for controlling the automatic transmission as a structural element, and a basic function of the electronic control unit fixes a gear ratio in the automatic transmission. When the gear ratio in the automatic transmission is fixed to a value corresponding to a low speed, the engine can be prevented from stalling.

A seventh basic embodiment of this invention is based on the first basic embodiment thereof. The seventh basic embodiment of this invention features that ones among the structural-element control portions which are necessary for travel of the vehicle include an electronic control unit for controlling the braking device as a structural element.

An eighth basic embodiment of this invention is based on the second basic embodiment thereof. The eighth basic embodiment of this invention features that ones among the structural-element control portions which are necessary for travel of the vehicle include an electronic control unit for controlling the braking device as a structural element, and a basic function of the electronic control unit implements control of the braking device in response to only a degree of depression of a brake pedal. High-performance brake control steps such as an anti-lock brake control step are omitted from the basic function of the electronic control unit. According to the basic function of the electronic control unit, it is possible to prevent the braking device from being disabled in general vehicle traveling conditions.

A ninth basic embodiment of this invention is based on the first basic embodiment thereof. The ninth basic embodiment of this invention features that the priority degrees are preset in order of structural-element control portions necessary for travel of the vehicle, structural-element control portions enhancing traveling performances of the vehicle, structural-element control portions increasing a comfortability of the vehicle, and other structural-element control portions.

The structural-element control portions necessary for travel of the vehicle include an electronic control unit for controlling the engine, an electronic control unit for controlling the automatic transmission, an electronic control unit for controlling the braking device, and an electronic control unit for controlling instruments such as a speedometer. The electronic control unit for controlling the engine, the electronic control unit for controlling the automatic transmission, and the electronic control unit for controlling the braking device are more necessary for travel of the vehicle, and are given a higher priority degree.

The structural-element control portions enhancing traveling performances of the vehicle include an electronic control unit for controlling a navigation device providing navigation services to a vehicle driver. The structural-element control portions increasing a comfortability of the vehicle include an electronic control unit for controlling the air conditioner which adjusts the temperature in the interior of the vehicle. The other structural-element control portions include an electronic control unit for controlling vehicle power windows.

A tenth basic embodiment of this invention is based on the first basic embodiment thereof. The tenth basic embodiment of this invention features that the download-destination structural-element control portion selected by the downloading means has a processing speed necessary to implement the function of the failed structural-element control portion, and has a storage capacity necessary to store the substitute program corresponding to the failed structural-element control portion. It is possible to surely download the substitute program into the download-destination structural-element control portion. Furthermore, the substitute program can be executed at a prescribed processing speed, and the vehicle is enabled to travel.

An eleventh basic embodiment of this invention is based on the tenth basic embodiment thereof. The eleventh basic embodiment of this invention features that the download-destination structural-element control portion selected by the downloading means is the lowest in priority degree. The substitute program is downloaded into one of non-failed structural-element control portions which has the lowest priority degree. It is possible that functions more necessary for travel of the vehicle remain.

A twelfth basic embodiment of this invention is based on the first basic embodiment thereof. The twelfth basic embodiment of this invention features that the downloading means comprises means for erasing a main control program from a memory area in the download-destination structural-element control portion, and for writing the substitute program thereinto. It is unnecessary to extend the storage capacity of each of the structural-element control portions. Thus, the twelfth basic embodiment of this invention is advantageous in cost. Preferably, at a service station, the main control program is reinstalled into the download-destination structural-element control portion.

A thirteenth basic embodiment of this invention is based on the first basic embodiment thereof. The thirteenth basic embodiment of this invention features that the manager control portion memorizes information about the failed structural-element control portion, and the downloading means executes download of the substitute program corresponding to the failed structural-element control portion in response to the information memorized by the manager control portion upon engine start. Since electric power fed from an alternator in the vehicle can be used upon engine start, it is possible to surely execute the download of the substitute program without providing an additional power feed circuit.

A fourteenth basic embodiment of this invention is based on the first basic embodiment thereof. The fourteenth basic embodiment of this invention features that the download-destination structural-element control portion suspends a heretofore control procedure when the downloading means executes download of the substitute program corresponding to the failed structural-element control portion. It is possible to surely execute the download of the substitute program.

Specific Embodiment

Figure 2:
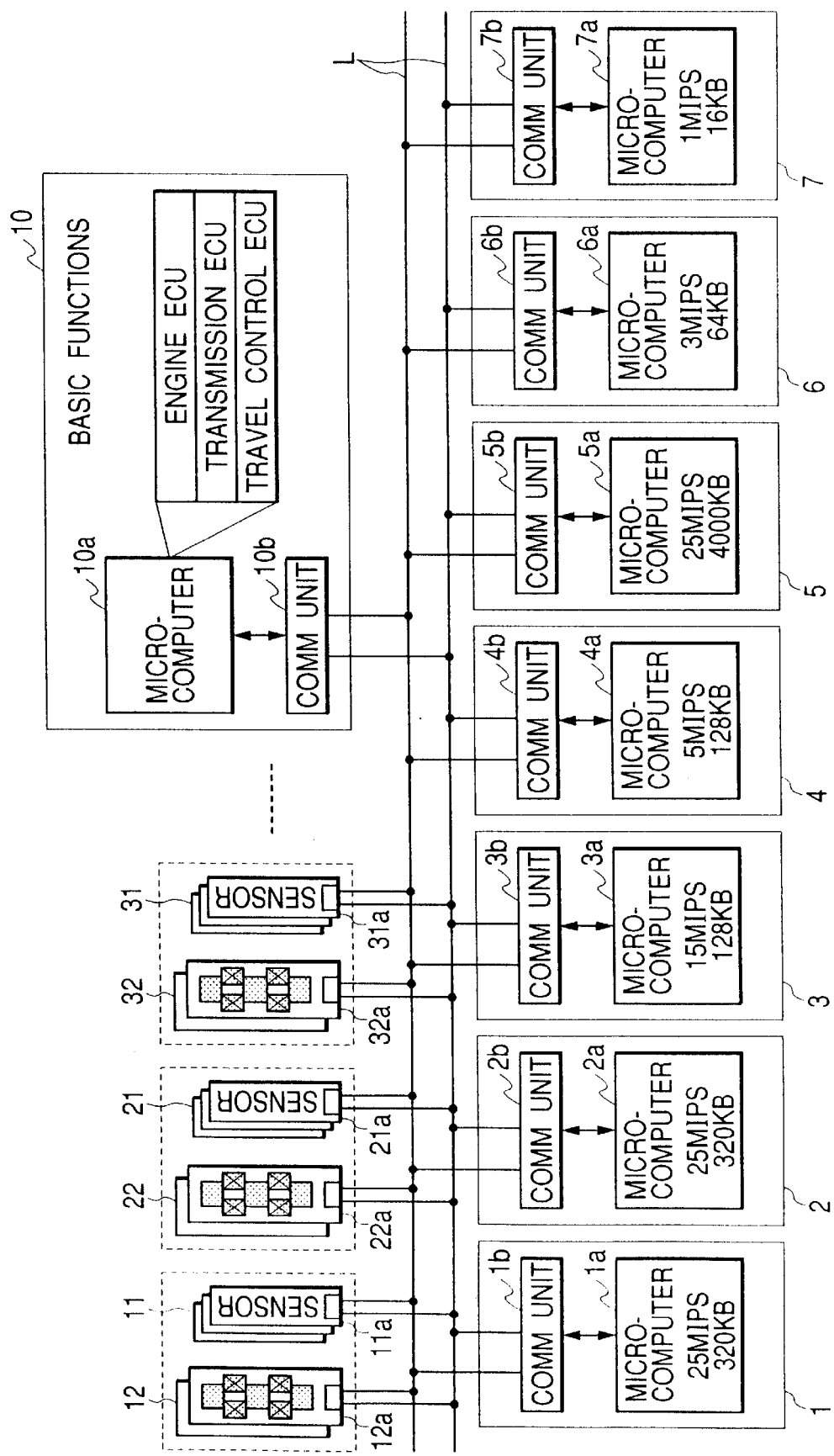
FIG. 2 is a block diagram of a fail-safe system according to a specific embodiment of this invention.

FIG. 2 shows a fail-safe system according to a specific embodiment of this invention. The fail-safe system of FIG. 2 is contained in an integrated system for implementing integrated control of structural elements (structural components) of a vehicle. The structural elements of the vehicle include, for example, an engine, an automatic transmission, a braking device, an air conditioner, and a navigation device (not shown).

The fail-safe system of FIG. 2 contains electronic control units (ECUs) 1, 2, 3, 4, 5, 6, and 7. The ECU 1 is designed to control the engine according to a preset control program. The ECU 1 is referred to as the engine ECU 1. The ECU 2 is designed to control the automatic transmission according to a preset control program. The ECU 2 is referred to as the transmission ECU 2. The ECU 3 is designed to control the braking device according to a preset control program. The ECU 3 is referred to as the travel control ECU 3. The ECU 4 is designed to control the air conditioner according to a preset control program. The ECU 4 is referred to as the air-conditioner ECU 4. The ECU 5 is designed to control the navigation device according to a preset control program. The ECU 5 is referred to as the navigation ECU 5. The ECU 6 is designed to control instruments such as a speedometer according to a preset control program. The ECU 6 is referred to as the first body ECU 6. The ECU 7 is designed to control power windows and a door lock key according to a preset control program. The ECU 7 is referred to as the second body ECU 7. The fail-safe system of FIG. 2 also contains a manager ECU 10 serving as a manager controller and monitoring the operating conditions of the ECUs 1–7.

Each of the ECUs 1–7 includes a microcomputer having a combination of an input/output port, a processing section, and a memory. Each of the ECUs 1–7 operates in accordance with a control program stored in its memory. The memory contains, for example, an electrically erasable programmable ROM and a RAM. The manager ECU 10 includes a microcomputer having a combination of an input/output port, a processing section, and a memory. The manager ECU 10 operates in accordance with a control program stored in its memory. The memory contains, for example, a ROM and a RAM. The memory also contains a nonvolatile memory such as a flash memory. The ECUs 1–7 and 10 are connected to each other via communication lines L for data transfer. Each of the ECUs 1–7 and 10 also includes a communication unit (a communication interface) via which its microcomputer is connected to the communication lines L.

Specifically, the engine ECU 1 includes a microcomputer 1a and a communication unit (a communication interface) 1b. The microcomputer 1a has a processing speed of 25 MIPS and a storage capacity of 320 KB. The communication unit 1b is connected to the communication lines L. The engine ECU 1 can perform data communications via the communication unit 1b. Sensors and switches are associated or connected with to the engine ECU 1. The sensors and switches include an accelerator pedal position sensor for detecting the degree of depression of an accelerator pedal, an air flow meter for detecting the rate of air flow into the engine, an intake air temperature sensor for detecting the temperature of intake air, a throttle position sensor for detecting the degree of opening of a throttle valve, an oxygen concentration sensor for detecting an oxygen concentration in exhaust gas, a coolant temperature sensor for detecting the temperature of engine coolant, a crank angle sensor for detecting the angular position and rotational speed of a crankshaft, and an ignition switch (an ignition key). Furthermore, actuators for controlling the engine are associated or connected with the engine ECU 1. The actuators include fuel injectors provided for cylinders of the engine, an igniter for generating a high ignition voltage, a fuel pump for feeding fuel from a fuel tank to the fuel injectors, and a throttle drive motor for opening and closing the throttle valve.

In more detail, the sensors associated or connected with the engine ECU 1 include ones 11 necessary for the travel of the vehicle. An example of such a sensor 11 is the crank angle sensor. The sensors 11 are directly connected to the communication lines L. Specifically, the sensors 11 include communication units (communication interfaces) 11a connected to the communication lines L. Signals are transmitted from the sensors 11 to the engine ECU 1 via the communication lines L. The actuators associated or connected with the engine ECU 1 include ones 12 necessary for the travel of the vehicle. Examples of the actuators 12 are the fuel injectors, the igniter, and the fuel pump. The actuators 12 are directly connected to the communication lines L. Specifically, the actuators 12 include communication units (communication interfaces) 12a connected to the communication lines L. Signals are transmitted from the engine ECU 1 to the actuators 12 via the communication lines L.

The transmission ECU 2 includes a microcomputer 2a and a communication unit (a communication interface) 2b. The microcomputer 2a has a processing speed of 25 MIPS and a storage capacity of 320 KB. The communication unit 2b is connected to the communication lines L. The transmission ECU 2 can perform data communications via the communication unit 2b. Sensors and switches are associated or connected with the transmission ECU 2. The sensors and switches include a rotational speed sensor for detecting the rotational speed of an input shaft between a torque converter and the automatic transmission, a vehicle speed sensor for detecting the speed of the vehicle from the rotational speed of a vehicle drive shaft coupled with an output shaft of the automatic transmission, a hydraulic fluid temperature sensor for detecting the temperature of working fluid in the automatic transmission, and a shift position switch for detecting the operation position (the shift position) of a shift lever operated by a vehicle driver. Furthermore, actuators for controlling the automatic transmission are associated or connected with the transmission ECU 2. The actuators include shift solenoids for changing the transmission gear ratio, a line pressure solenoid for controlling the force of engagement of gear connecting/disconnecting clutches, and a lock-up pressure solenoid for controlling the locking force of a lock-up clutch acting to couple the input and output shafts of the torque converter.

In more detail, the sensors associated or connected with the transmission ECU 2 include ones 21 necessary for the travel of the vehicle. Examples of the sensors 21 are the rotational speed sensor and the vehicle speed sensor. The sensors 21 are directly connected to the communication lines L. Specifically, the sensors 21 include communication units (communication interfaces) 21a connected to the communication lines L. Signals are transmitted from the sensors 21 to the transmission ECU 2 via the communication lines L. The actuators associated or connected with the engine ECU 2 include ones 22 necessary for the travel of the vehicle. Examples of the actuators 22 are the shift solenoids and the line pressure solenoid. The actuators 22 are directly connected to the communication lines L. Specifically, the actuators 22 include communication units (communication interfaces) 22a connected to the communication lines L. Signals are transmitted from the transmission ECU 2 to the actuators 22 via the communication lines L.

The travel control ECU 3 includes a microcomputer 3a and a communication unit (a communication interface) 3b. The microcomputer 3a has a processing speed of 15 MIPS and a storage capacity of 128 KB. The communication unit 3b is connected to the communication lines L. The travel control ECU 3 can perform data communications via the communication unit 3b. The travel control ECU 3 implements the control of the braking device which includes an anti-lock brake unit (an anti-lock brake system, ABS) for preventing the drive wheels of the vehicle from being locked when the vehicle is abruptly braked. The travel control ECU 3 and the engine ECU 1 cooperate to implement inter-vehicle control or automatic cruise control (ACC) for measuring the distance between a preceding vehicle and the present vehicle by a laser radar and controlling the inter-vehicle distance at a constant value, vehicle stabilizing control (VSC) for stabilizing the body of the vehicle when the vehicle travels along a curved road, and traction control (TRC) for preventing the drive wheels of the vehicle from slipping during acceleration. Sensors and switches are associated or connected with the travel control ECU 3. The sensors and switches include a master cylinder pressure sensor for detecting the hydraulic pressure in a master cylinder of the braking device, a steering sensor for detecting the steering angle of the vehicle, and a yaw rate sensor for detecting the yaw rate of the body of the vehicle. Furthermore, actuators are associated or connected with the travel control ECU 3. The actuators include a brake actuator for generating the hydraulic pressure in the master cylinder and executing brake control.

In more detail, the sensors associated or connected with the travel control ECU 3 include ones 31 necessary for the travel of the vehicle. An example of such a sensor 31 is the master cylinder pressure sensor. The sensors 31 are directly connected to the communication lines L. Specifically, the sensors 31 include communication units (communication interfaces) 31a connected to the communication lines L. Signals are transmitted from the sensors 31 to the travel control ECU 3 via the communication lines L. The actuators associated or connected with the travel control ECU 3 include ones 32 necessary for the travel of the vehicle. An example of such an actuator 32 is the brake actuator. The actuators 32 are directly connected to the communication lines L. Specifically, the actuators 32 include communication units (communication interfaces) 32a connected to the communication lines L. Signals are transmitted from the travel control ECU 3 to the actuators 32 via the communication lines L.

The air-conditioner ECU 4 includes a microcomputer 4a and a communication unit (a communication interface) 4b. The microcomputer 4a has a processing speed of 5 MIPS and a storage capacity of 128 KB. The communication unit 4b is connected to the communication lines L. The air-conditioner ECU 4 can perform data communications via the communication unit 4b. Sensors and switches are connected to the air-conditioner control ECU 4. The sensors and switches include an atmospheric temperature sensor, an in-vehicle air temperature sensor, and an air-conditioner switch operated by the vehicle driver. Furthermore, actuators are connected to the air-conditioner ECU 4. The actuators include a blower motor for driving air, and an air mix damper for changing the air mixing conditions. The air-conditioner ECU 4 can receive transmitted data via the communication lines L. The transmitted data represent, for example, the vehicle speed, the engine rotational speed, and the engine coolant temperature. The air-conditioner ECU 4 drives and controls the related actuators in response to the output signals from the related sensors and switches and the data received via the communication lines L.

The navigation ECU 5 includes a microcomputer 5a and a communication unit (a communication interface) 5b. The microcomputer 5a has a processing speed of 25 MIPS and a storage capacity of 4,000 KB. The communication unit 5b is connected to the communication lines L. The navigation ECU 5 can perform data communications via the communication unit 5b. Sensors and switches are connected to the navigation ECU 5. The sensors and switches include a position detecting device, a map data input device, sensors for detecting positional information, and operation switches. The position detecting device contains a GPS (Global Positioning System) receiver. Actuators are connected to the navigation ECU 5. The actuators include ones for indicating the current position of the vehicle on a display. The navigation ECU 5 can receive, via the communication lines L, information about the parameters such as the vehicle speed which are used in the calculation of the current position of the vehicle.

The first body ECU 6 includes a microcomputer 6a and a communication unit (a communication interface) 6b. The microcomputer 6a has a processing speed of 3 MIPS and a storage capacity of 64 KB. The communication unit 6b is connected to the communication lines L. The first body ECU 6 can perform data communications via the communication unit 6b. The first body ECU 6 is designed to control the instruments such as the speedometer in the vehicle instrument panel. Actuators are connected to the first body ECU 6. The actuators include ones for activating the instruments. The first body ECU 6 can receive transmitted data via the communication lines L. The transmitted data represent, for example, the vehicle speed and the engine coolant temperature. The first body ECU 6 drives and controls the related actuators in response to the data received via the communication lines L.

The second body ECU 7 includes a microcomputer 7a and a communication unit (a communication interface) 7b. The microcomputer 7a has a processing speed of 1 MIPS and a storage capacity of 16 KB. The communication unit 7b is connected to the communication lines L. The second body ECU 7 can perform data communications via the communication unit 7b. The second body ECU 7 is designed to control the power windows and the door lock key. Sensors and switches are connected to the second body ECU 7. The sensors and switches include sensors for detecting the rotational speeds of power window drive motors, power window switches, and door lock switches. Furthermore, actuators are connected to the second body ECU 7. The actuators include ones for activating the power window drive motors and door lock motors. The second body ECU 7 can receive transmitted data via the communication lines L. The transmitted data represent, for example, the vehicle speed. The second body ECU 7 determines whether or not the vehicle speed becomes equal to or higher than a prescribed value. When the vehicle speed becomes equal to or higher than the prescribed value, the second body ECU 7 activates the door lock motors to automatically lock the vehicle doors.

The manager ECU 10 includes a microcomputer 10a and a communication unit (a communication interface) 10b. The communication unit 10b is connected to the communication lines L. The manager ECU 10 can perform data communications via the communication unit 10b. The memory in the manager ECU 10 stores a basic program or basic programs designed to enable ones among the ECUs 1–7 to implement basic functions necessary for the travel of the vehicle. The manager ECU 10 determines whether or not each of the ECUs 1–7 fails. In the event that one of the ECUs 1–7 which is necessary for the travel of the vehicle fails, the manager ECU 10 transmits the failed-ECU-corresponding basic program to one of other normal ECUs via the communication lines L.

In order to optimally control the vehicle, data are transmitted among the ECUs 1–7 and 10, the sensors 11, 21, and 31, and the actuators 12, 22, and 32 via the communication lines L and the communication units 1b–7b, 10b, 11a, 21a, 31a, 12a, 22a, and 32a.

The fail-safe system of FIG. 2 features the following fail-safe procedure. In the event that one of the ECUs 1–7 fails, the vehicle is prevented from being completely stopped or disabled. Specifically, in such a case, a normal ECU (a non-failed ECU) among the ECUs 1–7 serves for executing the necessary function of the failed ECU. Thus, the vehicle is enabled to travel to a safe place or a service station.

The memory in the manager ECU 10 stores basic programs for implementing the simplified basic functions of the engine ECU 1, the transmission ECU 2, and the travel control ECU 3 which are necessary to move the vehicle. In the event that one of the ECU 1, the transmission ECU 2, and the travel control ECU 3 fails, the basic program related to the failed program is executed by one of other ECUs (normal ECUs). Program segments for implementing diagnoses and corrections in the general vehicle control are omitted from the basic programs. Accordingly, the sizes of the basic programs are relatively small.

Specifically, the memory in the manager ECU 10 stores a basic program corresponding to a basic function of the engine ECU 1. The basic program is designed to implement basic injection/ignition control by which the rate of fuel injection into the engine and the spark timing are fixed to predetermined values. Program segments for implementing corrections of the fuel injection rate and the spark timing are omitted from the basic program. According to the execution of the basic program, the fuel injectors are commanded to inject fuel at the fixed rate while the igniter is commanded to provide ignition at the fixed spark timing. Thus, the execution of the basic program enables the engine to output a torque necessary for the travel of the vehicle.

In addition, the memory in the manager ECU 10 stores a basic program corresponding to a basic function of the transmission ECU 2. The basic program is designed to implement fixed-gear-ratio control by which the engaged gears in the automatic transmission are fixed or the transmission gear ratio is fixed to a predetermined value. Preferably, the engaged gears and the fixed transmission gear ratio correspond to a low speed. Program segments for implementing fine gear ratio control are omitted from the basic program. According to the execution of the basic program, the automatic transmission is commanded to provide a fixed axle torque in a relation to the engine torque caused by the basic function of the engine ECU 1. Thus, the execution of the basic program enables the vehicle to travel while preventing the engine from stalling.

Furthermore, the memory in the manager ECU 10 stores a basic program corresponding to a basic function of the travel control ECU 3. The basic program is designed to implement fixed basic brake control by which the braking responsive to only the degree of depression of a brake pedal is carried out. Program segments for implementing high-level control procedures corresponding to the ABS, ACC, VSC, and TRC are omitted from the basic program. According to the execution of the basic program, the braking device is prevented from being disabled in general vehicle traveling conditions. Thus, the safety of the vehicle is secured.

Preset priority degrees (preset priority levels) are given to the ECUs 1–7 respectively. The memory in the manager ECU 10 stores information about the priority degrees given to the ECUs 1–7. The manager ECU 10 determines the destination to which each of the basic programs is downloaded in accordance with the order given by the priority degrees. The manager ECU 10 transmits the basic program to the determined destination.

As shown in FIG. 3, the highest priority degree "A" is given to the engine ECU 1, the transmission ECU 2, and the travel control ECU 3 which are necessary for the travel of the vehicle. The second highest priority degree "B" is given to the first body ECU 6 which is necessary for the travel of the vehicle. The intermediate priority degree "C" lower than the second highest priority degree "B" is given to the navigation ECU 5 which enhances the traveling performances of the vehicle. The second lowest priority degree "D" lower than the intermediate priority degree "C" is given to the air-conditioner ECU 4 which increases the comfortability of the interior of the vehicle. The lowest priority degree "E" is given to the second body ECU 7. The processing speeds and storage capacities of the microcomputers 1a–7a in the ECU 1–7 are also indicated in FIG. 3. The memory in the manager ECU 10 stores information about the processing speeds and storage capacities of the microcomputers 1a–7a in the ECU 1–7.

As previously mentioned, the memory in the manager ECU 10 stores the basic programs corresponding to the basic functions of the engine ECU 1, the transmission ECU 2, and the travel control ECU 3. As shown in FIG. 4, the minimum processing speed necessary for the execution of the basic program corresponding to the basic function of the engine ECU 1 is equal to 7 MIPS, and the size of the basic program is equal to 32 KB. The minimum processing speed necessary for the execution of the basic program corresponding to the basic function of the transmission ECU 2 is equal to 5 MIPS, and the size of the basic program is equal to 16 KB. The minimum processing speed necessary for the execution of the basic program corresponding to the basic function of the travel control ECU 3 is equal to 3 MIPS, and the size of the basic program is equal to 16 KB. The memory in the manager ECU 10 stores information about the minimum processing speeds necessary for the execution of the basic programs corresponding to the basic functions of the engine ECU 1, the transmission ECU 2, and the travel control ECU 3. Furthermore, the memory in the manager ECU 10 stores information about the sizes of the basic programs corresponding to the basic functions of the engine ECU 1, the transmission ECU 2, and the travel control ECU 3.

Figure 5:
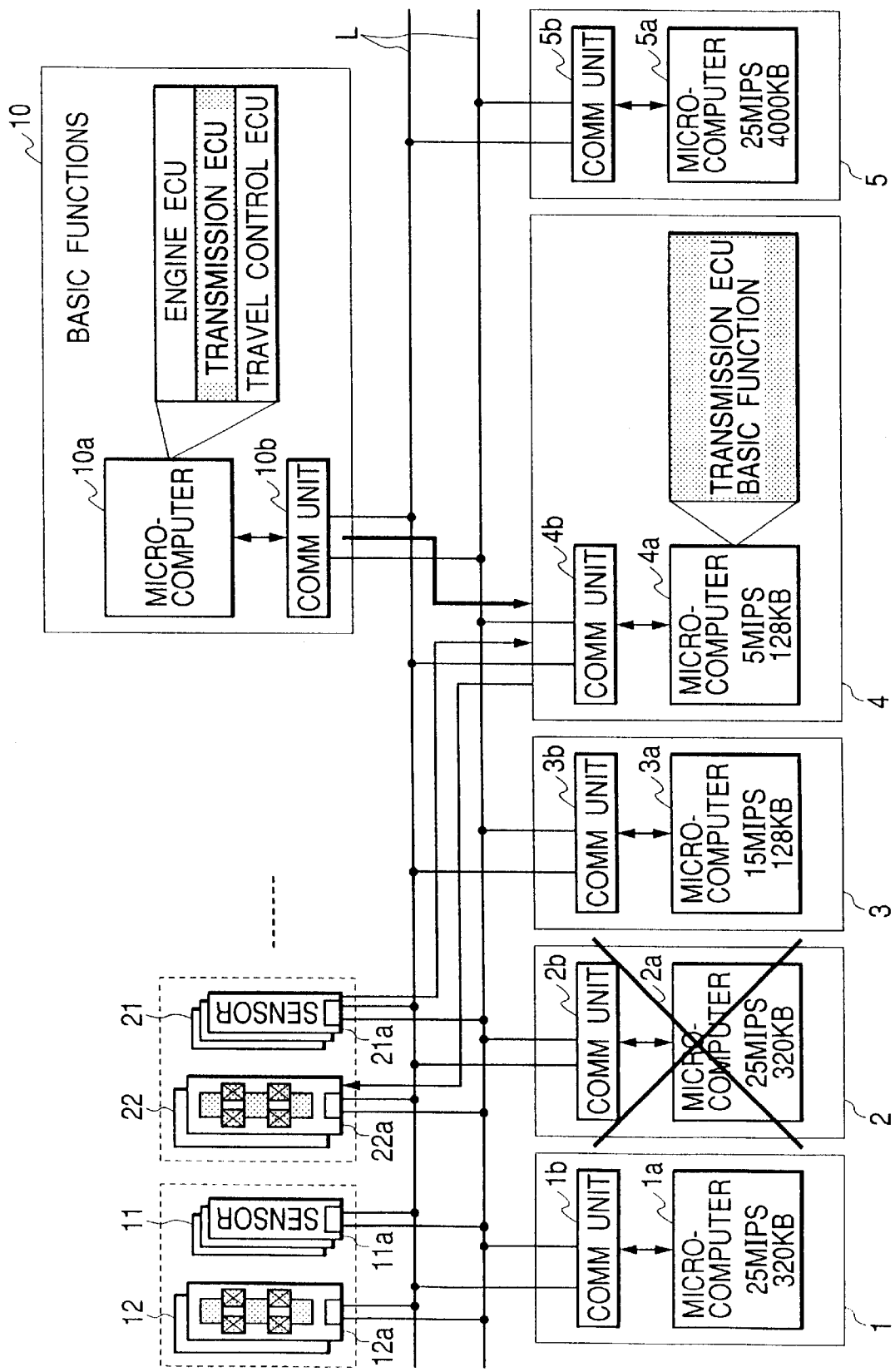
FIG. 5 is a block diagram of the fail-safe system of FIG. 2 in which one of ECUs fails.

With reference to FIG. 5, in the event that the transmission ECU 2 fails, the manager ECU 10 refers to the minimum processing speed (5 MIPS) necessary for the execution of the basic program corresponding to the basic function of the transmission ECU 2 and also the size (16 KB) of the basic program, and selects one from the ECUs 1 and 3–7 as a substitute for the failed transmission ECU 2 on the basis of the minimum processing speed and the basic program size. The substitute ECU is required to have a capacity of storing the basic program on a downloading basis and an ability to execute the basic program. In more detail, the substitute ECU is required to have a processing speed equal to or higher than the minimum processing speed (5 MIPS) and a storage capacity equal to or greater than the basic program size (16 KB). The substitute ECU corresponds to a destination to which the basic program is downloaded from the manager ECU 10.

Specifically, the download destination to be selected is required to be lower in priority degree than the transmission ECU 2 (the priority degree "A"). Therefore, the first body ECU 6 (the priority degree "B"), the navigation ECU 5 (the priority degree "C"), the air-conditioner ECU 4 (the priority degree "D"), and the second body ECU 7 (the priority degree "E") which are lower in priority degree than the transmission ECU 2 are preliminarily selected. Among the ECUs 4–7, the navigation ECU 5 and the air-conditioner ECU 4 are further selected as ones which meet the requirements related to the minimum processing speed and the basic program size. One of the ECUs 4 and 5 which is the lowest in priority degree is selected. Thus, the air-conditioner ECU 4 is finally selected as the download destination.

Subsequently, the manager ECU 10 transmits the basic program, which corresponds to the basic function of the transmission ECU 2, to the air-conditioner ECU 4 so that the basic program is downloaded into the air-conditioner ECU 4. The air-conditioner ECU 4 executes the downloaded basic program. According to the downloaded basic program, the air-conditioner ECU 4 receives, via the communication lines L, the sensor output signals originally directed to the transmission ECU 2, and generates drive signals in response to the received sensor output signals. The air-conditioner ECU 4 transmits the drive signals to the actuators originally assigned to the transmission ECU 2. As a result, the air-conditioner ECU 4 serves for the basic function of the transmission ECU 2 which is necessary to enable the vehicle to travel. Therefore, the vehicle can be moved to a safe place or a service station.

In the event that the engine ECU 1 fails, the manager ECU 10 refers to the minimum processing speed (7 MIPS) necessary for the execution of the basic program corresponding to the basic function of the engine ECU 1 and also the size (32 KB) of the basic program, and selects one from the ECUs 2–7 as a substitute for the failed engine ECU 1 on the basis of the minimum processing speed and the basic program size. The substitute ECU is required to have a capacity of storing the basic program on a downloading basis and an ability to execute the basic program. In more detail, the substitute ECU is required to have a processing speed equal to or higher than the minimum processing speed (7 MIPS) and a storage capacity equal to or greater than the basic program size (32 KB). The substitute ECU corresponds to a destination to which the basic program is downloaded from the manager ECU 10.

Specifically, the download destination to be selected is required to be lower in priority degree than the engine ECU 1 (the priority degree "A"). Therefore, the first body ECU 6 (the priority degree "B"), the navigation ECU 5 (the priority degree "C"), the air-conditioner ECU 4 (the priority degree "D"), and the second body ECU 7 (the priority degree "E") which are lower in priority degree than the engine ECU 1 are preliminarily selected. Among the ECUs 4–7, the navigation ECU 5 is further selected as one which meets the requirements related to the minimum processing speed and the basic program size. Thus, the navigation ECU 5 is finally selected as the download destination.

Subsequently, the manager ECU 10 transmits the basic program, which corresponds to the basic function of the engine ECU 1, to the navigation ECU 5 so that the basic program is downloaded into the navigation ECU 5. The navigation ECU 5 executes the downloaded basic program. According to the downloaded basic program, the navigation ECU 5 receives, via the communication lines L, the sensor output signals originally directed to the engine ECU 1, and generates drive signals in response to the received sensor output signals. The navigation ECU 5 transmits the drive signals to the actuators originally assigned to the engine ECU 1. As a result, the navigation ECU 5 serves for the basic function of the engine ECU 1 which is necessary to enable the vehicle to travel. Therefore, the vehicle can be moved to a safe place or a service station.

In the event that the travel control ECU 3 fails, the manager ECU 10 refers to the minimum processing speed (3 MIPS) necessary for the execution of the basic program corresponding to the basic function of the travel control ECU 3 and also the size (16 KB) of the basic program, and selects one from the ECUs 1–2 and 4–7 as a substitute for the failed travel control ECU 3 on the basis of the minimum processing speed and the basic program size. The substitute ECU is required to have a capacity of storing the basic program on a downloading basis and an ability to execute the basic program. In more detail, the substitute ECU is required to have a processing speed equal to or higher than the minimum processing speed (3 MIPS) and a storage capacity equal to or greater than the basic program size (16 KB). The substitute ECU corresponds to a destination to which the basic program is downloaded from the manager ECU 10.

Specifically, the download destination to be selected is required to be lower in priority degree than the travel control ECU 3 (the priority degree "A"). Therefore, the first body ECU 6 (the priority degree "B"), the navigation ECU 5 (the priority degree "C"), the air-conditioner ECU 4 (the priority degree "D"), and the second body ECU 7 (the priority degree "E") which are lower in priority degree than the travel control ECU 3 are preliminarily selected. Among the ECUs 4–7, the navigation ECU 5 and the air-conditioner ECU 4 are further selected as ones which meet the requirements related to the minimum processing speed and the basic program size. One of the ECUs 4 and 5 which is the lowest in priority degree is selected. Thus, the air-conditioner ECU 4 is finally selected as the download destination.

Subsequently, the manager ECU 10 transmits the basic program, which corresponds to the basic function of the travel control ECU 3, to the air-conditioner ECU 4 so that the basic program is downloaded into the air-conditioner ECU 4. The air-conditioner ECU 4 executes the downloaded basic program. According to the downloaded basic program, the air-conditioner ECU 4 receives, via the communication lines L, the sensor output signals originally directed to the travel control ECU 3, and generates drive signals in response to the received sensor output signals. The air-conditioner ECU 4 transmits the drive signals to the actuators originally assigned to the travel control ECU 3. As a result, the air-conditioner ECU 4 serves for the basic function of the travel control ECU 3 which is necessary to enable the vehicle to travel. Therefore, the vehicle can be moved to a safe place or a service station.

Figure 6:
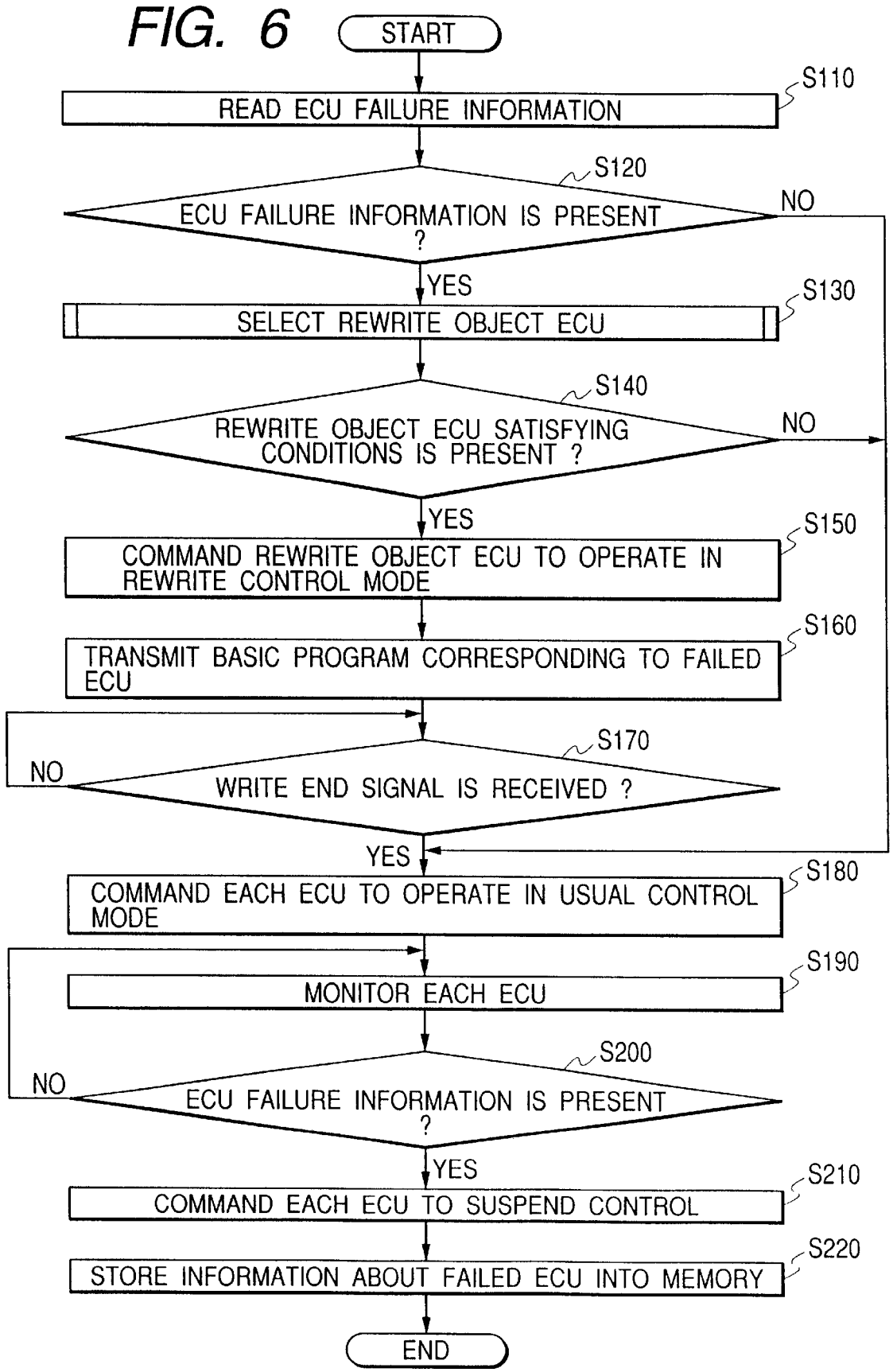
FIG. 6 is a flowchart of a segment of a control program for a manager ECU in FIG. 2.

The manager ECU 10 operates in accordance with a control program stored in its internal memory. FIG. 6 is a flowchart of a segment of the control program which is started when the ignition switch is changed to its ON position.

With reference to FIG. 6, a first step S110 of the program segment reads or retrieves information (failure information) about failures of the ECUs 1–7 which has been stored when the engine is stopped last or when the ignition key is changed to its OFF position last.

A step S120 following the step S110 determines whether or not the ECUs 1–7 contain a failed ECU by referring to the failure information. When the ECUs 1–7 do not contain any failed ECU, the program advances from the step S120 to a step S180. On the other hand, when the ECUs 1–7 contain a failed ECU, the program advances from the step S120 to a block S130 for selecting a download-destination ECU.

Thus, the execution of the determination as to whether or not the ECUs 1–7 contain a failed ECU is caused by the change of the ignition key to its ON position. Accordingly, downloading a basic program can be performed at a time of the start of the engine for which loads on the ECUs 1–7 are relatively small.

The step S180 transmits signals to the ECUs 1–7 which command them to operate in usual control modes. In other words, the step S180 commands the ECUs 1–7 to operate in the usual control modes. In response to the command signals, the ECUs 1–7 start operating in the usual control modes. In this case, the ECUs 1–7 implement usual control procedures. After the step S180, the program advances to a step S190.

The step S190 implements an ordinary monitoring mode of operation. The step S190 monitors operating conditions of the ECUs 1–7 to get information about failures thereof.

A step S200 subsequent to the step S190 determines whether or not information representing a failure of at least one of the ECUs 1–7 is present. When information representing a failure of at least one of the ECUs 1–7 is absent, the program returns from the step S200 to the step S190. On the other hand, when information representing a failure of at least one of the ECUs 1–7 is present, the program advances from the step S200 to a step S210.

The step S210 transmits command signals to the ECUs 1–7 which force them to suspend their control procedures to maintain the safety of the vehicle. In other words, the step S210 commands the ECUs 1–7 to suspend their control procedures. In response to the command signals, the ECUs 1–7 suspend their control procedures. Preferably, the step S210 activates a voice generator (a voice synthesizer) to auditorily inform the vehicle driver that the failure of an ECU occurs.

A step S220 following the step S210 stores the information about the failed ECU into the non-volatile memory. After the step S220, the current execution cycle of the program segment ends.

Figure 7:
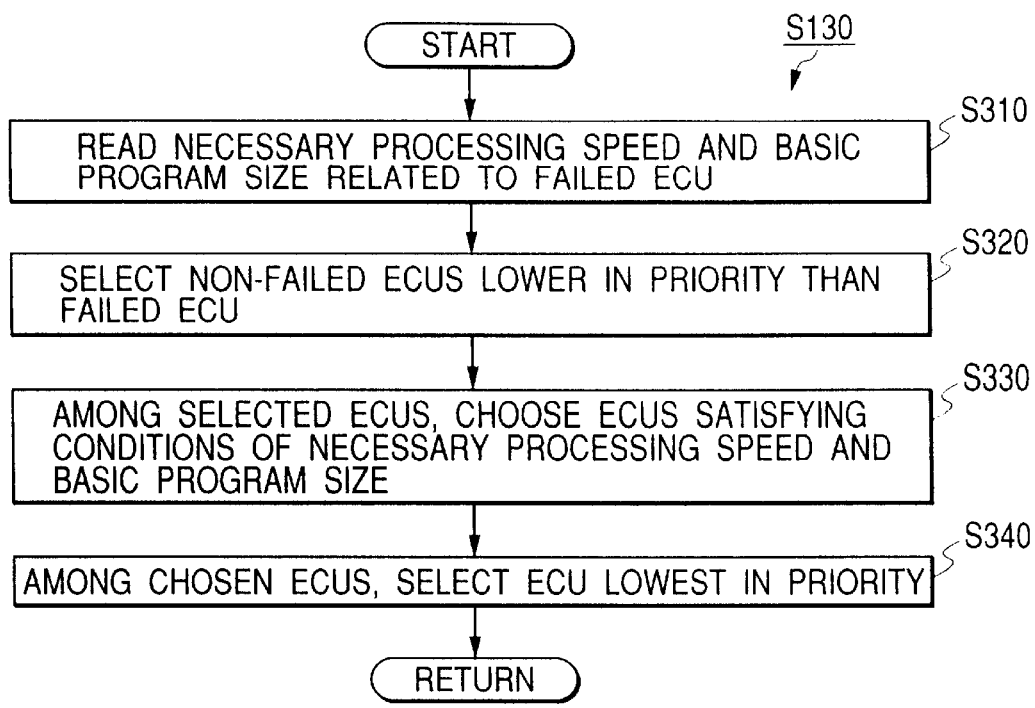
FIG. 7 is a flowchart of a block in FIG. 6.

As shown in FIG. 7, the download-destination selecting block S130 has steps S310, S320, S330, and S340. The step S310 follows the step S120 in FIG. 6. The step S310 identifies the failed ECU among the ECUs 1–7 in accordance with the failure information. The step S310 reads, from the memory, the information about the minimum processing speed necessary for the execution of the basic program corresponding to the basic function of the failed ECU. In addition, the step S310 reads, from the memory, the information about the size of the basic program corresponding to the basic function of the failed ECU.

The step S320 which follows the step S310 reads, from the memory, the information about the priority degrees given to the ECUs 1–7. The step S320 groups the ECUs 1–7 into failed one and normal ones by referring to the failure information. The step S320 selects normal ECUs from the ECUs 1–7 which are lower in priority degree than the failed ECU.

The step S330 which is subsequent to the step S320 reads, from the memory, the information about the processing speeds and storage capacities of the normal ECUs selected by the step S320. Among the normal ECUs selected by the step S320, the step S330 selects ones which have storage capacities equal to or greater than the size of the basic program corresponding to the basic function of the failed ECU, and which have processing speeds equal to or higher than the minimum processing speed necessary for the execution of the basic program corresponding to the basic function of the failed ECU.

The step S340 follows the step S330. Among the ECUs selected by the step S330, the step S340 selects one which is the lowest in priority degree as a download-destination ECU. The step S340 is followed by a step S140 in FIG. 6.

With reference back to FIG. 6, the step S140 determines whether or not a download-destination ECU has been successfully found by the download-destination selecting block S130. When a download-destination ECU has been successfully found, the program advances from the step S140 to a step S150. Otherwise, the program advances from the step S140 to the step S180.

The step S150 transmits a signal to the download-destination ECU which commands the operation of the download-destination ECU to change to a program write mode. In other words, the step S150 commands the download-destination ECU to change its operation to the program write mode. In response to the command signal, the download-destination ECU starts operating in the program write mode.

A step S160 subsequent to the step S150 transmits the basic program, which corresponds to the basic function of the failed ECU, to the download-destination ECU as a substitute program. The transmitted basic program (the transmitted substitute program) is installed into the download-destination ECU. When the installation of the basic program is completed, the download-destination ECU transmits a write end signal. After the step S160, the program advances to a step S170.

The step S170 determines whether or not the write end signal has been received from the download-destination ECU. When the write end signal has been received, the program advances from the step S170 to the step S180. Otherwise, the step S170 is repeated.

As previously mentioned, the step S180 commands the ECUs 1–7 to operate in the usual control modes. Thereafter, the step S190 implements the ordinary monitoring mode of operation. The step S190 monitors operating conditions of the ECUs 1–7 to get information about failures thereof. Specifically, the step S190 transmits test signals to the ECUs 1–7. The step S190 gets information about failures of the ECUs 1–7 from their responses to the test signals. Alternatively, the step S190 may get information about failures of the ECUs 1–7 on the basis of failure-indicating signals spontaneously outputted from the ECUs 1–7.

Subsequently, the step S200 determines whether or not information representing a failure of at least one of the ECUs 1–7 is present. When information representing a failure of at least one of the ECUs 1–7 is absent, the program returns from the step S200 to the step S190. On the other hand, when information representing a failure of at least one of the ECUs 1–7 is present, the program advances from the step S200 to the step S210. As previously mentioned, the step S210 commands the ECUs 1–7 to suspend their control procedures to maintain the safety of the vehicle. Preferably, the step S210 activates the voice generator (the voice synthesizer) to auditorily inform the vehicle driver that the failure of an ECU occurs. Thereafter, the step S220 stores the information about the failed ECU into the non-volatile memory. After the step S220, the current execution cycle of the program segment ends.

In the case where the failed ECU does not hinder the travel of the vehicle, the step S210 may refrain from outputting the command signals for forcing the ECUs 1–7 to suspend their control procedures.

Figure 8:
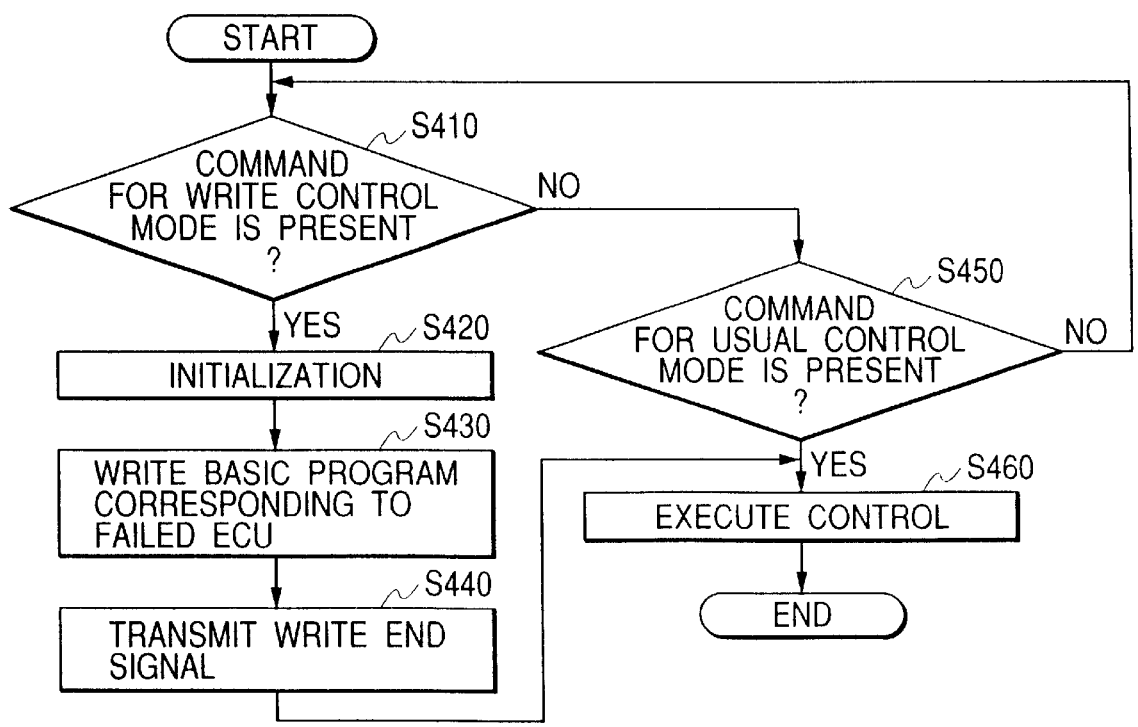
FIG. 8 is a flowchart of a segment of a control program for each of ECUs in FIG. 2 except the manager ECU.

Each of the ECUs 1–7 operates in accordance with a control program stored in its internal memory of the electrically erasable programmable type. FIG. 8 is a flowchart of a sub-segment of the control program which is started when the ignition switch is changed to its ON position. The control program has a main segment for implementing the main work (the control procedure) assigned to the present ECU.

With reference to FIG. 8, a first step S410 of the program sub-segment determines whether or not a command signal for changing the operation of the present ECU to the program write mode has been received from the manager ECU 10. When the command signal has been received, the program advances from the step S410 to a step S420. Otherwise, the program advances from the step S410 to a step S450.

The step S420 erases the main segment of the control program from the memory to provide a usable area therein. Specifically, the step S420 initializes a part of the memory which stores the main segment of the control program.

A step S430 subsequent to the step S420 receives the basic program (the substitute program) from the manager ECU 10. The step S430 writes the received basic program into the usable area in the memory as a new main segment of the control program. When the writing of the basic program is completed, the program advances from the step S430 to a step S440.

The step S440 transmits a write end signal to the manager ECU 10. After the step S440, the program advances to a step S460.

The step S460 commands the execution of the main segment of the control program. As a result, the main segment of the control program is executed by the present ECU. Thus, in the case where the original main segment of the control program has been replaced by the substitute program, the present ECU serves for the failed ECU. Therefore, the vehicle is enabled to travel. On the other hand, in the case where the original main segment of the control program remains, the present ECU implements the control procedure decided thereby. After the step S460, the current execution cycle of the program sub-segment ends.

The step S450 determines whether or not a signal commanding the present ECU to operate in the usual control mode has been received from the manager ECU 10. When the command signal has been received, the program advances from the step S450 to the step S460. Otherwise, the program returns from the step S450 to the step S410.

As previously mentioned, the step S460 commands the execution of the main segment of the control program. Therefore, the main segment of the control program is executed, and the related control procedure is implemented. After the step S460, the current execution cycle of the program sub-segment ends.

The fail-safe system of FIG. 2 has the following features. The preset priority degrees are given to the ECUs 1–7, respectively. The ECUs 1–7 have predetermined processing speeds and storage capacities. The engine ECU 1, the transmission ECU 2, and the travel control ECU 3 are necessary for the travel of the vehicle. In the event that the manager ECU 10 detects a failure of one of the ECUs 1–3, the manager ECU 10 determines normal ones of the ECUs 1–7 and selects one from the normal ECUs according to the priority degrees, the processing speeds, and the storage capacities. The manager ECU 10 downloads the basic program, which corresponds to the basic function of the failed ECU, into the selected ECU. Thus, the selected ECU serves for the failed ECU, and drives and controls the actuators assigned to the failed ECU.

Therefore, in the event that one of the ECUs 1–3 fails, the vehicle is enabled to continue to travel. Accordingly, the vehicle can be moved to a safe place or a service station.

Not only the ECUs 1–7 but also other ECUs may be controlled by the manager ECU 10. Ones among the ECUs 1–7 may be arbitrarily designated by a system designer as ECUs necessary for the travel of the vehicle. The memory in the manager ECU 10 may further store the basic programs corresponding to the basic functions of ECUs other than those necessary for the travel of the vehicle. The basic program may be written into an unused area of the memory in the download-destination ECU. Failures of the ECUs 1–7 may be detected by mutual monitoring procedures implemented by the ECUs 1–7. Preferably, the communication lines L has two wires. The communication lines L may be replaced by a single-wire communication line. The processing speeds and storage capacities of the ECU 1–7 may be equal to values different from those in FIG. 3.

What is claimed is:

1. A fail-safe system used in integrated control of a vehicle, comprising:

a plurality of actuators for actuating a plurality of structural elements provided on the vehicle, respectively;

a plurality of sensors for detecting state quantities used in control of operation of the structural elements, respectively;

a plurality of structural-element control portions for driving and controlling the actuators on the basis of the state quantities detected by the sensors according to preset control programs, respectively, wherein preset priority degrees are given to the structural-element control portions respectively;

a manager control portion for storing one or more substitute programs designed to implement functions of ones among the structural-element control portions which are necessary for travel of the vehicle;

a communication line;

wherein actuators and sensors among the actuators and the sensors which are necessary for travel of the vehicle, the structural-element control portions, and the manager control portion are connected to the communication line to implement communications thereamong;

failure detecting means for detecting failures of the structural-element control portions; and downloading means for, when the failure detecting means detects a failure of one of the structural-element control portions which is necessary for travel of the vehicle, selecting one from non-failed ones of the structural-element control portions as a download destination in accordance with the priority degrees and downloading the substitute program corresponding to the failed structural-element control portion into the selected download-destination structural-element control portion, the selected download-destination structural-element control portion being lower in priority degree than the failed structural-element control portion;

wherein the download-destination structural-element control portion drives and controls the actuator corresponding to the failed structural-element control portion on the basis of the state quantity detected by the sensor corresponding to the failed structural-element control portion according to the downloaded substitute program.

2. A fail-safe system as recited in claim 1, wherein the substitute programs include basic programs designed to implement basic functions of ones among the structural-element control portions which are necessary for travel of the vehicle.

3. A fail-safe system as recited in claim 1, wherein ones among the structural-element control portions which are necessary for travel of the vehicle include an electronic control unit for controlling an engine as a structural element.

4. A fail-safe system as recited in claim 2, wherein ones among the structural-element control portions which are necessary for travel of the vehicle include an electronic control unit for controlling an engine as a structural element, and a basic function of the electronic control unit fixes a fuel injection rate and a spark timing.

5. A fail-safe system as recited in claim 1, wherein ones among the structural-element control portions which are necessary for travel of the vehicle include an electronic control unit for controlling an automatic transmission as a structural element.

6. A fail-safe system as recited in claim 2, wherein ones among the structural-element control portions which are necessary for travel of the vehicle include an electronic control unit for controlling an automatic transmission as a structural element, and a basic function of the electronic control unit fixes a gear ratio in the automatic transmission.

7. A fail-safe system as recited in claim 1, wherein ones among the structural-element control portions which are necessary for travel of the vehicle include an electronic control unit for controlling a braking device as a structural element.

8. A fail-safe system as recited in claim 2, wherein ones among the structural-element control portions which are necessary for travel of the vehicle include an electronic control unit for controlling a braking device as a structural element, and a basic function of the electronic control unit implements control of the braking device in response to only a degree of depression of a brake pedal.

9. A fail-safe system as recited in claim 1, wherein the priority degrees are preset in order of structural-element control portions necessary for travel of the vehicle, structural-element control portions enhancing traveling performances of the vehicle, structural-element control portions increasing a comfortability of the vehicle, and other structural-element control portions.

10. A fail-safe system as recited in claim 1, wherein the download-destination structural-element control portion selected by the downloading means has a processing speed necessary to implement the function of the failed structural-element control portion, and has a storage capacity necessary to store the substitute program corresponding to the failed structural-element control portion.

11. A fail-safe system as recited in claim 10, wherein the download-destination structural-element control portion selected by the downloading means is the lowest in priority degree.

12. A fail-safe system as recited in claim 1, wherein the downloading means comprises means for erasing a main control program from a memory area in the download-destination structural-element control portion, and for writing the substitute program thereinto.

13. A fail-safe system as recited in claim 1, wherein the manager control portion memorizes information about the failed structural-element control portion, and the downloading means executes download of the substitute program corresponding to the failed structural-element control portion in response to the information memorized by the manager control portion upon engine start.

14. A fail-safe system as recited in claim 1, wherein the download-destination structural-element control portion suspends a heretofore control procedure when the downloading means executes download of the substitute program corresponding to the failed structural-element control portion.

15. A method of fail-safe used in integrated control of a vehicle, comprising the steps of:

detecting state quantities used in control of operation of vehicle structural elements actuated by actuators;

enabling structural-element control portions to drive and control the actuators on the basis of the detected state quantities according to preset control programs, respectively, wherein preset priority degrees are given to the structural-element control portions respectively;

detecting whether or not each of ones among the structural-element control portions which are necessary for travel of the vehicle fails; and when it is detected that one among the structural-element control portions which is necessary for travel of the vehicle fails, selecting one from non-failed ones of the structural-element control portions as a download destination in accordance with the priority degrees and downloading a substitute program corresponding to the failed structural-element control portion into the selected download-destination structural-element control portion, the selected download-destination structural-element control portion being lower in priority degree than the failed structural-element control portion;

wherein the download-destination structural-element control portion drives and controls the actuator corresponding to the failed structural-element control portion on the basis of the detected state quantity corresponding to the failed structural-element control portion according to the downloaded substitute program.

16. A fail-safe system used in integrated control of a vehicle, comprising:

a plurality of input output elements;

a plurality of structural-element control portions for operation with the input output elements according to preset control programs, respectively, wherein preset priority degrees are given to the structural-element control portions respectively;

a manager control portion for storing one or more substitute programs designed to implement functions of ones among the structural-element control portions which are necessary for travel of the vehicle;

a communication line;

wherein ones among the input output elements which are necessary for travel of the vehicle, the structural-element control portions, and the manager control portion are connected to the communication line to implement communications thereamong;

failure detecting means for detecting failures of the structural-element control portions; and downloading means for, when the failure detecting means detects a failure of one of the structural-element control portions which is necessary for travel of the vehicle, selecting one from non-failed ones of the structural-element control portions as a download destination in accordance with the priority degrees and downloading the substitute program corresponding to the failed structural-element control portion into the selected download-destination structural-element control portion, the selected download-destination structural-element control portion being lower in priority degree than the failed structural-element control portion;

wherein the download-destination structural-element control portion serves for the failed structural-element control portion according to the downloaded substitute program.

17. A fail-safe system as recited in claim 16, wherein the input output elements include actuators and sensors.

* * * * *